(12) United States Patent
Park

(10) Patent No.: US 8,549,842 B2
(45) Date of Patent: Oct. 8, 2013

(54) AIR ASSISTED INJECTOR, AND INJECTION SYSTEM AND EXHAUST TREATMENT SYSTEM INCORPORATING THE SAME

(75) Inventor: Deokkyu (James) Park, Naperville, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 173 days.

(21) Appl. No.: 12/628,435

(22) Filed: Dec. 1, 2009

(65) Prior Publication Data

US 2011/0126529 A1    Jun. 2, 2011

(51) Int. Cl.
*F01N 3/36* (2006.01)

(52) U.S. Cl.
USPC ............ 60/289; 60/286; 60/303; 60/307; 60/740; 239/429

(58) Field of Classification Search
USPC .......... 60/740, 743, 289, 307, 303; 239/413, 239/416.4, 416.5, 417.3, 418, 423, 424, 425, 239/429, 430, 433, 434.5, 67–69
See application file for complete search history.

(56) References Cited

U.S. PATENT DOCUMENTS

| | | | | |
|---|---|---|---|---|
| 2,933,259 | A * | 4/1960 | Raskin | 239/405 |
| 3,072,344 | A * | 1/1963 | McKenzie | 239/433 |
| 5,174,111 | A | 12/1992 | Nomura et al. | |
| 5,189,876 | A | 3/1993 | Hirota et al. | |
| 5,725,154 | A * | 3/1998 | Jackson | 239/135 |
| 5,829,683 | A * | 11/1998 | Beaudoin et al. | 239/429 |
| 7,121,085 | B2 | 10/2006 | Van Nieuwstadt | |
| 2003/0033799 | A1 * | 2/2003 | Scheying | 60/286 |
| 2008/0209897 | A1 * | 9/2008 | Urven et al. | 60/303 |

* cited by examiner

*Primary Examiner* — Thomas Denion
*Assistant Examiner* — Jorge Leon, Jr.
(74) *Attorney, Agent, or Firm* — Cantor Colburn LLP

(57) ABSTRACT

An air-assisted fluid injector has an injector housing having a nozzle bore and an injector nozzle sealably disposed in the nozzle bore and having an exposed injector face on one end that projects from an end of the nozzle bore, the injector nozzle having a fluid conduit on an other end that extends from a fluid inlet toward the injector face and that opens into a plurality of fluid outlet conduits that extend to a corresponding plurality of fluid outlets spaced apart on the injector face and operable to provide a predetermined spray pattern. The injector also includes an air conduit having an air inlet on the other end of the injector nozzle extending through the injector housing and opening into a plurality of air conduit outlets proximate the injector face, each air conduit outlet extending to and opening into a respective fluid conduit outlet.

21 Claims, 7 Drawing Sheets

AIR ASSISTED INJECTOR, AND INJECTION SYSTEM AND EXHAUST TREATMENT SYSTEM INCORPORATING THE SAME

FIELD OF THE INVENTION

Exemplary embodiments of the present invention are related to exhaust aftertreatment systems and, more specifically, to a hydrocarbon (HC) injector, an HC injection system incorporating the same and methods of making and using the same.

BACKGROUND

Exhaust aftertreatment systems, particularly vehicular systems, increasingly make use of hydrocarbon injection for treatment of various exhaust constituents of the exhaust gas flow. For example, vehicles equipped with diesel engines typically include exhaust systems that may have diesel particulate filters for removing particulate matter from the exhaust stream. With use, soot or other carbon-based particulate matter (PM) accumulates on the diesel particulate filters. To prevent diesel particulate filters from becoming excessively loaded, they are periodically regenerated by burning off (i.e., oxidizing) the particulates that accumulate on the filters. One approach for regeneration is to inject HC (e.g., fuel) into the exhaust gas flow for combustion, such as by the use of an oxidation catalyst, to raise the temperature of the exhaust and promote combustion of the accumulated PM in the filter.

In addition to particulate filters for removing PM, exhaust systems can be equipped with catalytic devices for removing or controlling other undesirable emission constituents, such as carbon monoxide (CO) and nitrogen oxides ($NO_x$). Catalytic devices such as lean $NO_x$ catalysts, selective catalytic reduction (SCR) catalysts and lean $NO_x$ traps. These devices also may make use of HC injection, either to promote the catalytic reaction or to regenerate the catalyst material.

HC can be provided by controlling the combustion process so that unburned HC remains post-combustion in the exhaust gas flow. HC can also be provided by injecting HC directly into the exhaust aftertreatment system, such as by using a fuel injector that is operably attached to the fuel tank through various fuel conduits. While direct injection has been used for this purpose, its usefulness has been limited by the ability to provide low cost injectors that atomize the fuel sufficiently for evaporation and combustion in the exhaust aftertreatment system and that are also resistant to clogging or plugging by PM and other constituents found in the exhaust gas flow. Insufficient atomization of the HC can result in incomplete combustion or conversion by the exhaust treatment devices that allows the HC to slip through the system and be released to the external environment. HC slip also reduces the overall fuel efficiency of the engine, and in vehicular application, the efficiency of the vehicle.

Accordingly, it is desirable to provide fuel injectors that improve fuel atomization, reduce HC slip and improve engine and vehicle fuel efficiency.

SUMMARY OF THE INVENTION

In one exemplary embodiment of the present invention, an air-assisted fluid injector is provided. The injector includes an injector housing having a nozzle bore. The injector also includes an injector nozzle sealably disposed in the nozzle bore and having an exposed injector face on one end that projects from an end of the nozzle bore, the injector nozzle having a fluid conduit on an other end that extends from a fluid inlet toward the injector face and that opens into a plurality of fluid outlet conduits that extend to a corresponding plurality of fluid outlets on the injector face. The injector also includes an air conduit having an air inlet on the other end of the injector nozzle, the air conduit extending through the injector housing and opening into a plurality of air conduit outlets proximate the injector face, each air conduit outlet extending to and opening into a respective fluid conduit outlet, wherein the plurality of fluid outlets are spaced apart on the injector face and operable to provide a predetermined spray pattern of a fluid and air.

In another exemplary embodiment of the present invention, an air-assisted fluid injector system is provided. The system includes an injector comprising: an injector housing having a nozzle bore; an injector nozzle sealably disposed in the nozzle bore and having an exposed injector face on one end that projects from an end of the nozzle bore, the injector nozzle having a fluid conduit on an other end that extends from a fluid inlet toward the injector face and that opens into a plurality of fluid outlet conduits that extend to a corresponding plurality of fluid outlets on the injector face; and an air conduit having an air inlet on the other end of the injector nozzle, the air conduit extending through the injector housing and opening into a plurality of air conduit outlets proximate the injector face, each air conduit outlet extending to and opening into a respective fluid conduit outlet; wherein the plurality of fluid outlets are spaced apart on the injector face to provide a predetermined spray pattern. The system also includes a source of a pressurized fluid that is fluidly coupled by a fluid source conduit to the inlet of the fluid conduit for release of pressurized into the injector. Further, the system includes a source of pressurized air that is fluidly coupled by an air source conduit to the inlet of the air conduit for release of pressurized air into the injector. Still further, the system also includes a controller that is in signal communication with the source of pressurized fluid and the source of pressurized air and is configured to control the release of a pressurized fluid flow and a pressurized airflow from the injector in the predetermined spray pattern.

In yet another exemplary embodiment of the present invention, an internal combustion engine and exhaust gas treatment system having an air-assisted fluid injector system is provided. The system includes an internal combustion engine and an exhaust gas treatment system comprising at least one exhaust treatment device that is fluidly coupled by an exhaust conduit to the engine and configured to receive an exhaust gas flow therefrom. The system also includes an injector system comprising: an injector, the injector comprising: an injector housing having a nozzle bore; an injector nozzle sealably disposed in the nozzle bore and having an exposed injector face on one end that projects from an end of the nozzle bore, the injector nozzle having a fluid conduit on an other end that extends from a fluid inlet toward the injector face and that opens into a plurality of fluid outlet conduits that extend to a corresponding plurality of fluid outlets on the injector face, the plurality of fluid outlets being spaced apart on the injector face to provide a predetermined spray pattern; an air conduit having an air inlet on the other end of the injector nozzle, the air conduit extending through the injector housing and opening into a plurality of air conduit outlets proximate the injector face, each air conduit outlet extending to and opening into a respective fluid conduit outlet; and an injector housing boss having a housing portion on one end and a nozzle portion on another end, the injector housing being detachably disposed within the housing portion, the injector nozzle being sealably disposed within the nozzle portion; wherein the injector housing boss is attached to the exhaust conduit upstream of the exhaust treatment device and the plurality of fluid outlets are in fluid communication with the exhaust gas flow. Further, the system includes a source of a pressurized fluid that is fluidly coupled by a fluid source conduit to the inlet of the fluid conduit for release of pressurized into the injector. Yet further, the system includes a source of pressurized air that is fluidly coupled by an air source conduit to the inlet of the air conduit for release of pressurized air into the injector. Even further, the system includes a controller that is in signal communication with the source of pressurized fluid and the source of pressurized air and is configured to control the release of a pressurized fluid flow and a pressurized airflow from the injector in the predetermined spray pattern.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Referring to FIGS. 1-11, in accordance with an exemplary embodiment of the present invention, an engine 1 and associated exhaust aftertreatment system 2 and is shown that includes an HC injection system 10. HC injection system 10 includes at least one HC injector 12. HC injection system 10 and HC injector 12 advantageously reduce hydrocarbon slip through exhaust aftertreatment system 2 by enhancing the atomization and evaporation of the fuel injected into the system by using compressed air supplied by an air compressor, as described further herein.

Figure 1:
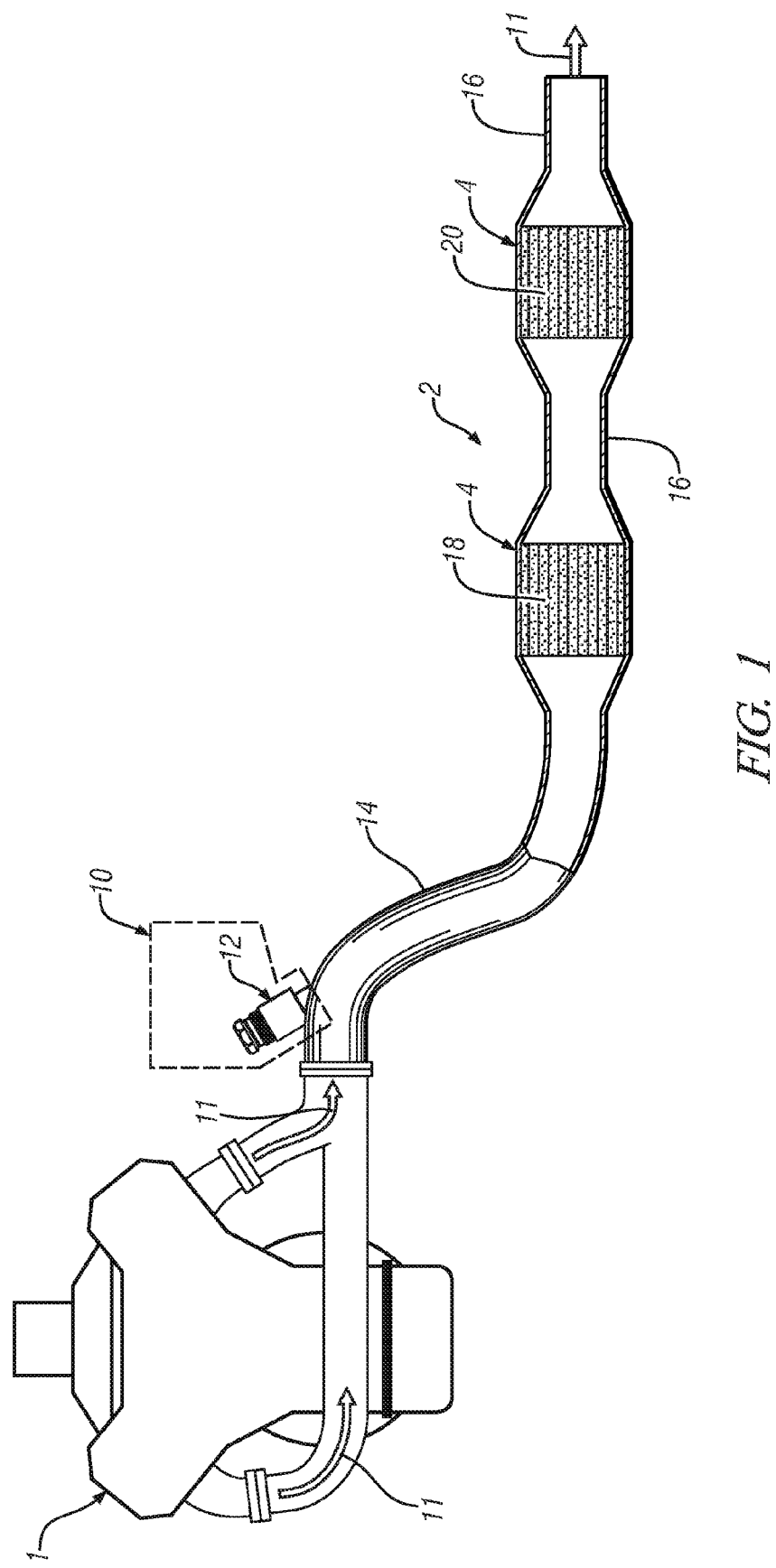
FIG. 1 is a schematic view of an engine and exhaust treatment system that includes an air assisted HC injector as disclosed herein.

An assembly for treating an exhaust gas flow 11 from an internal combustion engine 1 includes exhaust aftertreatment system 2 is shown in FIG. 1. Exhaust aftertreatment system 2 includes a plurality of exhaust treatment devices 4 and is configured to be fluidly and operably attached to an internal combustion engine 1. Exhaust aftertreatment system 2 may be used with any internal combustion engine, including various gasoline and diesel engines. In the embodiment shown in FIG. 1, exhaust treatment devices 4 include a diesel oxidation catalyst (DOC) 18 and a diesel particulate filter (DPF) 20; however, any suitable exhaust treatment device may be used, including those having various capabilities for treating the constituent elements of the exhaust gas feedstream, including oxidation, selective catalytic reduction, HC dosing, and particulate filtering. Examples include catalyzed or uncatalyzed diesel particulate filters, air pumps, external heating devices, sulfur traps, phosphorous traps, selective reduction devices, including hydrocarbon selective catalyst reduction (HC—SCR) catalysts, urea selective catalyst reduction (U-SCR) catalysts, $NO_x$ traps, $PO_x$ reformers and the like. In an exemplary embodiment, engine 1 is a diesel engine. Exhaust aftertreatment system 2 and exhaust treatment devices 4 may be fluidly attached to engine 1 using one or more exhaust pipes or conduits 14.

Figure 2:
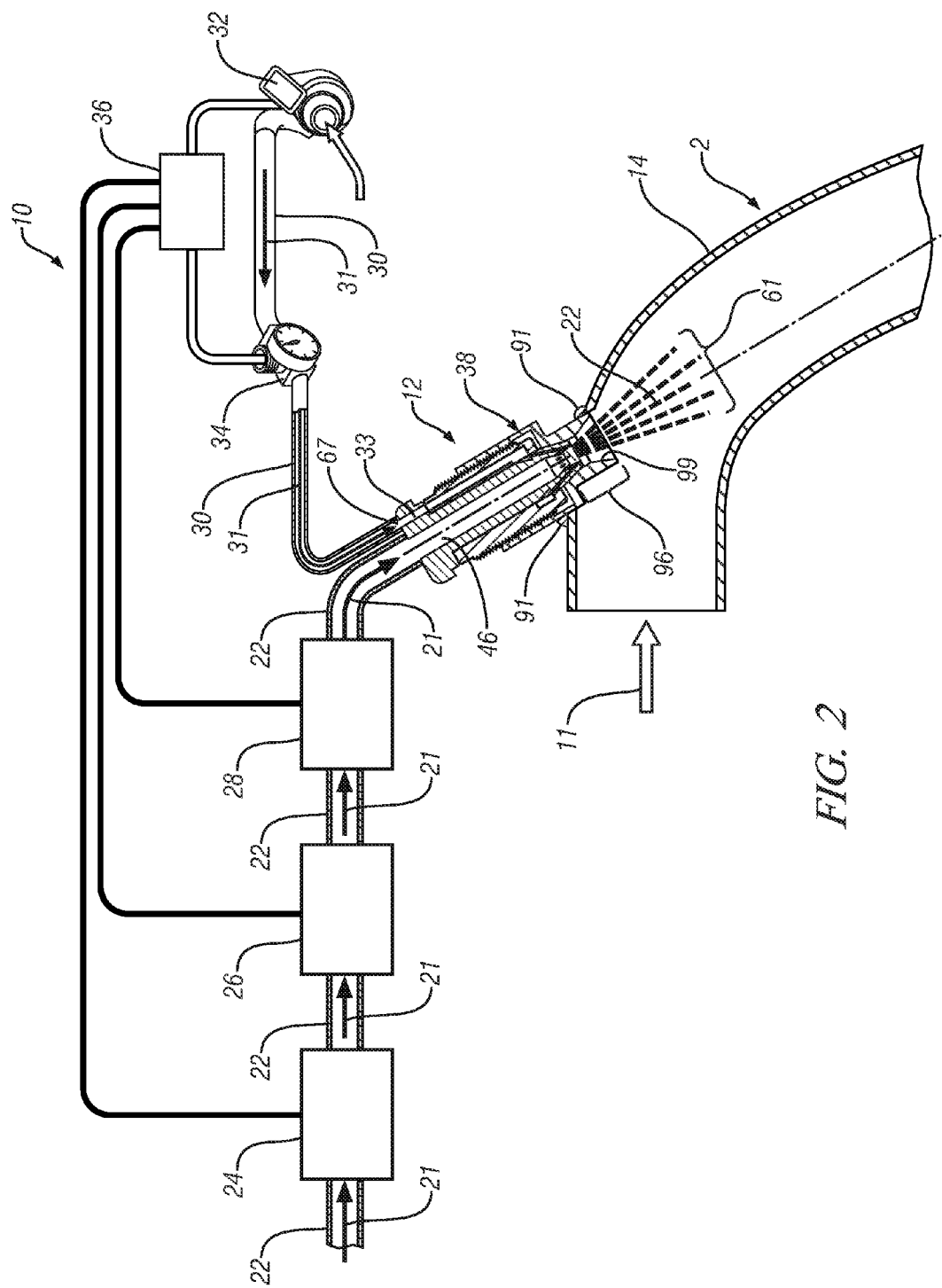
FIG. 2 is a partial cross-sectional view of the HC injector and exhaust conduit of FIG. 1 together with a schematic view of certain elements of an exemplary embodiment of an HC injector system and an exhaust treatment system as disclosed herein.

As illustrated in FIGS. 1 and 2, HC injection (HCI) system 10 is configured to inject a suitable HC through HC injector 12 into exhaust aftertreatment system 2 and exhaust flow 11 for use in conjunction with exhaust treatment devices 4. Any suitable HC source may be used; however, it is desirable to use the same HC source that is used to fuel the engine, such that the HC may be drawn from the fuel source used to fuel the engine, such as an onboard fuel tank in the case of a movable vehicle, or a supply line that is connected to a fuel distribution system in the case of a stationary engine installation. For example, in a vehicular diesel engine, diesel fuel may be drawn from an onboard tank for use as the HC in HCI system 10. The HC source may include gasoline or diesel fuel and HCI system 10 and HC injector 12 may be designated as a fuel injection system and a fuel injector, respectively. HCI system 10 is operably and fluidly connected to the HC source through fuel conduit 22 to provide fuel flow as represented by arrow 21. The fuel is pumped from the source, such as a fuel tank, using a high pressure fuel pump 24. Pressurized fuel flow 21 is pumped through a downstream fuel conduit 22 to a downstream fuel regulator 26. Fuel regulator 26 is operably and fluidly connected to a downstream fuel conduit 22 and solenoid valve 28. Fuel regulator 26 may be configured to control the fuel pressure in fuel conduit 22. In an exemplary embodiment, fuel regulator 26 is configured to maintain constant fuel pressure in the downstream fuel conduit 22. Solenoid fuel valve 28 is configured to open and close to release the pressurized fuel in fuel flow 21 into conduit 22, and ultimately into exhaust aftertreatment system 2 and exhaust conduit 14 for mixing with exhaust gas flow 11. Fuel regulator 26 and fuel solenoid 28 are in signal communication with controller 36, such as an engine control unit (ECU). Fuel flow 21 is released into HC injector 12 and conduit 14 by operation of solenoid fuel valve 28, such as by cycling the valve open and closed in accordance with a duty cycle which may be controlled by controller 36 to release a predetermined amount of fuel into system 2. The duty cycle may be a predetermined duty cycle and may be correlated to engine speed, or engine torque, or a combination thereof, or a operating condition within exhaust aftertreatment system 2, such as a backpressure or temperature in the system upstream of DPF 20, to a release predetermined amount of fuel into conduit 14. In an exemplary embodiment, the predetermined amount may be an amount sufficient to induce an exothermic reaction in the DOC 18.

As shown in FIG. 2, in an exemplary embodiment, HCI system 10 includes HC injector 12 and a pressurized air source. Pressurized air is supplied from a pressurized air source through a pressurized air conduit 30 and flows as a pressurized airflow as indicated by arrows 31. Any suitable pressurized air source may be used to supply pressurized air. In an exemplary embodiment, pressurized air source includes an air compressor 32. In an exemplary embodiment, air assisted HCI system 10 may also include an air regulator 34 to control the pressure, flow rate, or a combination thereof, of compressed airflow 31 from air compressor 32. In an exemplary embodiment, as shown in FIG. 2, both air compressor 32 and air regulator 34 may be in signal communication with a controller 36, which is configured to control the pressure or flow rate, or a combination thereof, or other aspect of airflow 31 to a predetermined level or a plurality of predetermined levels, such as for example a data table of a plurality of predetermined airflows 31 that correlates to a plurality of predetermined fuel flows 21. In an exemplary embodiment, a predetermined pressure or flow rate, or a combination thereof, or other aspects of airflow 31 may be correlated to engine speed, or engine torque, or a combination thereof, or exhaust gas backpressure or other aspects of exhaust aftertreatment system 2, as described herein. Compressor 32 may be operated, and pressurized airflow 31 may be provided, either periodically or continuously while the engine is being operated to maintain a pressure, or flow rate, or combination thereof, that is greater than the pressure of exhaust gas flow 11 within conduit 14, particularly at the location of HC injector 12, and sufficient to prevent HC injector 12 from being clogged by soot accumulation, particularly on the tip portion of HC injector 12 and orifices therein that are exposed to exhaust gas flow 11 within conduit 14. The air pressure in the pressurized air conduit 30 should also be higher than the fuel pressure in the fuel conduit 22 to enhance fuel atomization and evaporation and reduce the potential for, or prevent, ingress of fuel into the air conduit 30, including air conduits within HC injector 12 as described herein.

As illustrated in FIGS. 3-11, in an exemplary embodiment, HC injector 12 includes an assembly of three parts, injector housing boss 38, injector housing 40 and air-assisted HC injector nozzle 42. Each of injector housing boss 38, injector housing 40 and air-assisted HC injector nozzle 42, as well their assembly, is described below.

As shown in FIGS. 3-6 and 11, HC injector nozzle 42 may be made from any suitable high temperature material, including various high temperature metals or metal alloys, and particularly various grades of steel. In an exemplary embodiment, various grades of stainless steel may be used to form HC injector nozzle 42, particularly those grades that are resistant to corrosion associated with various HC materials, including commonly used liquid fuels, such as diesel and gasoline (including various gasoline formulations that also include alcohol), as well as being resistant to high temperature oxidation or corrosion associated with the constituents of high temperature exhaust gas flows. HC injector nozzle 42 may have any suitable size (e.g., length and diameter). In the exemplary embodiment shown, HC injector nozzle 42 has a generally cylindrical shape with a tapered nozzle tip 43 on one end and on an opposite end a protruding head 45, with the tapered nozzle tip 43 and protruding head 45 separated by a cylindrical section 47. Protruding head 45 may also include a bolt head shape with hexagonally oriented flats 49 of a conventional bolt head that may be used with an appropriate tool, such as a wrench, to rotate HC injector nozzle 42 within injector housing 40 to obtain alignment of the portions of air conduit 33 described herein. Upon assembly and fixing of HC injector nozzle 42 within injector housing 40, flats 49 may also be used to turn the assembly of HC injector nozzle 42 and injector housing 40 into injector housing boss 38, as disclosed herein. Cylindrical section 47 is configured for sealable engagement within injector housing 40. In the exemplary embodiment of FIGS. 3-11, sealable engagement may be obtained by welding HC injector nozzle 42 to injector housing 40 as disclosed herein.

HC injector nozzle 42 includes a fuel conduit inlet 44 in protruding head 45 that opens into a fuel conduit 46. Fuel conduit inlet 44 may be configured for attachment and sealing engagement with a fuel line, such as by incorporating a plurality of threads (not shown) to enable sealing engagement of a threaded fuel line (not shown). Fuel conduit 46 extends from protruding head 45 through cylindrical section 47 into tapered nozzle tip 43. Fuel conduit 46 may have any suitable shape, including, in the exemplary embodiment shown in FIGS. 3-6 and 11, that of a substantially blind central bore 51 within HC injector nozzle 42. Central bore 51 may have any suitable size (e.g., diameter and length) sufficient to deliver the desired fuel flow 21 to exhaust treatment system 2, including in an exemplary application a diameter of about 0.125 in. to about 0.25 in. Fuel conduit 46 may have any suitable length, which will generally be determined to accommodate a predetermined packaging envelope for HC injector 12. The closed end of the substantially blind central bore 51 may include an inwardly narrowing taper 53 at the closed end of the bore. The taper angle and length of the taper are matters of design choice. Central bore 51 is described as substantially blind because while the central bore 51 terminates within tapered nozzle tip 43, fuel conduit 46 has a plurality of outlets 48 provided through a network that includes a plurality of smaller fuel outlet conduits 64.

Fuel outlet conduits 64 extend from a corresponding plurality of outlet conduit inlets 63 that are spaced along fuel conduit 46. In the exemplary embodiment of FIGS. 3-11, outlet conduit inlets 63 are axially spaced along fuel conduit 46 by the same axial distance and have circumferentially spaced positions that provides the same angular spacing between adjacent inlets about the conduit axis 55; however, it will be understood that for each of the inlets, the axial distance may be different, and the circumferential positions of the inlets may be selected to provide different angular spacings between adjacent inlets. In the exemplary embodiment of FIGS. 3-11, circumferentially spaced outlet conduit inlets 63 are disposed on taper 53 and extend to a corresponding plurality of outlet conduit outlets 48 on the injector face 66.

The size, spacing, number and angular orientation of fuel outlet conduits 64 will be selected to accommodate a predetermined flow rate, spray pattern, or a combination thereof, for the fuel flow 21. More particularly, fuel conduit 46 and fuel outlet conduits 64 will be selected to provide sufficient fuel to achieve and sustain a predetermined exothermic oxidation reaction in DOC 18 and to achieve and sustain a predetermined temperature of this device. Generally, the size and number of fuel outlet conduits 64 will be as small as possible to achieve a predetermined flow rate or spray pattern 61, and will depend on the fuel pressure and air pressure, as well as the diameter of air conduit 33 and fuel conduit 46. In an exemplary embodiment, the size of fuel outlet conduits 64 may include diameters of about 0.0118 in. to about 0.0197 in. Any suitable number fuel outlet conduits 64 may be employed to achieve a predetermined spray pattern 61. In the exemplary embodiment of FIGS. 3-11, there are about 10 equally spaced fuel outlet conduits 64, in other exemplary embodiments, about 7 to about 10 conduits may be employed. Fuel outlet conduits 64 may have any suitable shape, including various right cylindrical and curved cylindrical shapes. In the embodiment shown in FIGS. 3-6 and 11, fuel outlet conduits 64 have a right circular cylindrical shape. Fuel outlet conduits 64 may have any suitable orientation within HC injector nozzle 42 and tapered nozzle tip 43. In the exemplary embodiment of FIGS. 3-6 and 11, the circumferentially spaced fuel outlet conduits 64 maintain their circumferential spacing as they diverge away from the conduit axis 55 between the outlet conduit inlets 63 located on taper 53 and the outlet conduit outlets 48 located on the injector face 66. The angle of divergence ($\beta$), FIG. 6, of the axes 57 of fuel outlet conduits 64 and the conduit axis 55 may be any suitable angle, including acute angles, particularly divergence angles ($\beta$) of less than about 11°, and, more particularly, those where $\beta$ is less than about 8°. The number, size, shape, circumferential positions, angular spacings and divergence angle ($\beta$) of the fuel outlet conduits provide a predetermined spray pattern 61 (FIG. 2) of fuel exiting the conduits. In the embodiment of FIGS. 3-6 and 11, the axes 57 of respective fuel outlet conduits 64 fall within a diverging conical plane, such that the predetermined spray pattern 61 (FIG. 2) formed by fuel flow 21 passing through these conduits includes a diverging pattern away from injector face 66, and more particularly a diverging conical spray pattern. A diverging predetermined spray pattern 61 (FIG. 2) is desirable to enhance the air-assisted dispersion of fuel flow into exhaust gas flow 11. While a diverging predetermined spray pattern 61 (FIG. 2) is desirable to enhance dispersion, it will be understood that the characteristics of fuel outlet conduit 64 described above may be altered to provide predetermined spray pattern 61 having many other shapes, including parallel or converging spray patterns. Enhanced dispersion of fuel flow 21 within exhaust gas flow 11 promotes more complete, and hence more efficient, oxidation of the fuel, thereby lessening the demand for fuel for use in exhaust aftertreatment system 2 and enhancing the fuel economy of engine 1, and for engines 1 used in vehicular applications, enhancing the fuel economy of the vehicle in which the engine 1 and exhaust aftertreatment system 2 are used.

Figure 3:
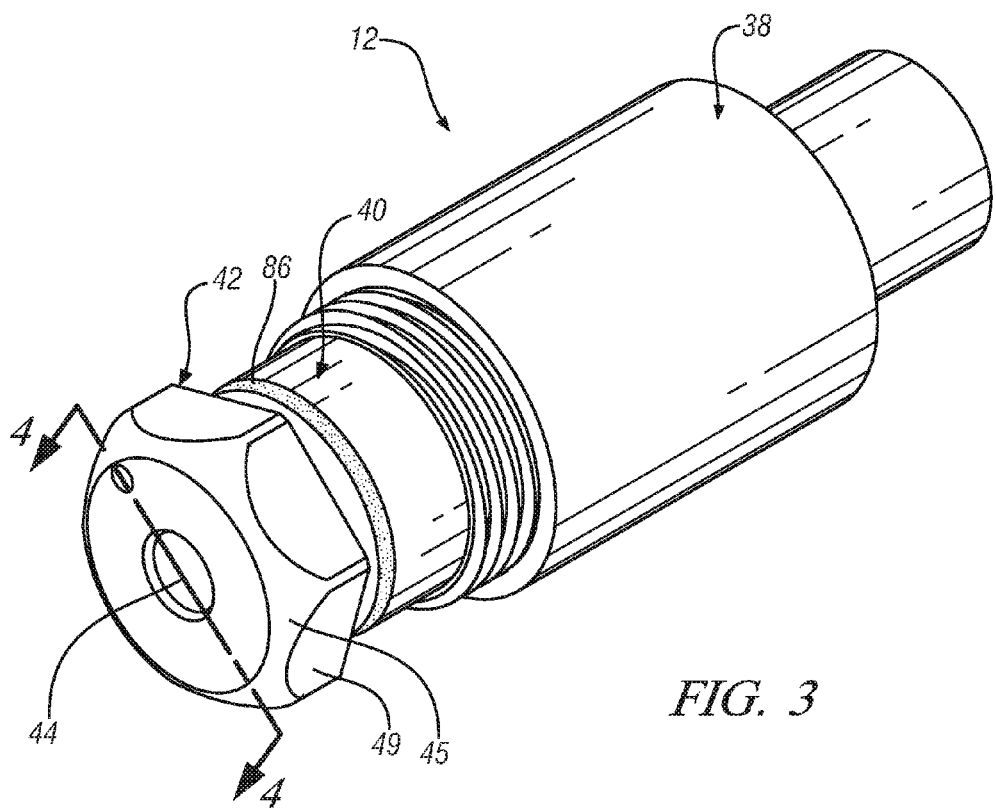
FIG. 3 is a perspective view of an exemplary embodiment of an HC injector as disclosed herein.
Figure 4:
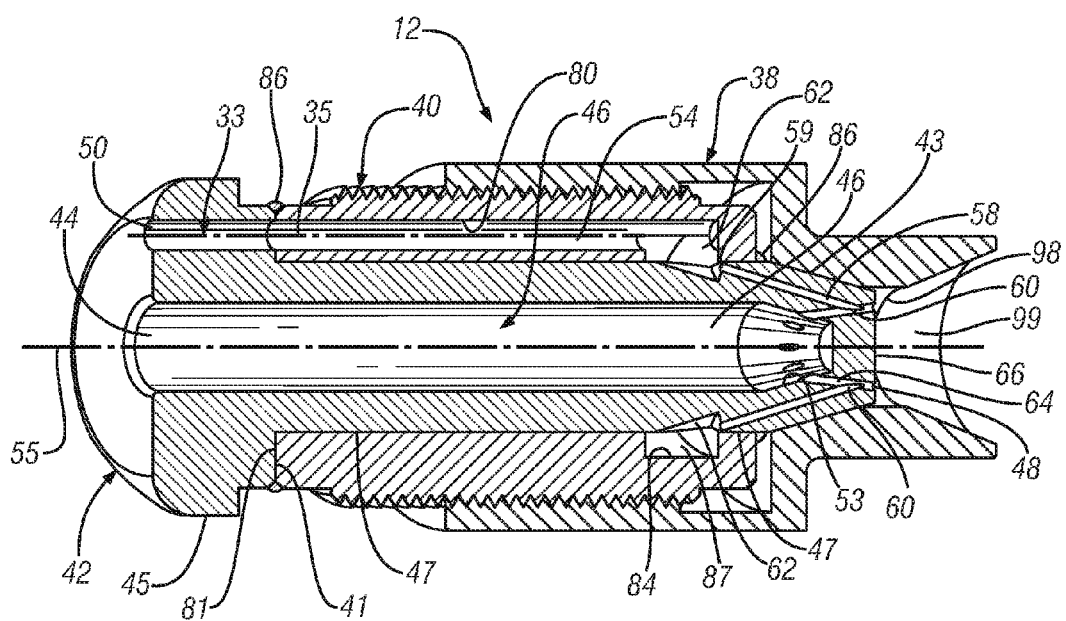
FIG. 4 is a cross-sectional perspective view of the injector of FIG. 3 taken along section 4-4.
Figure 5:
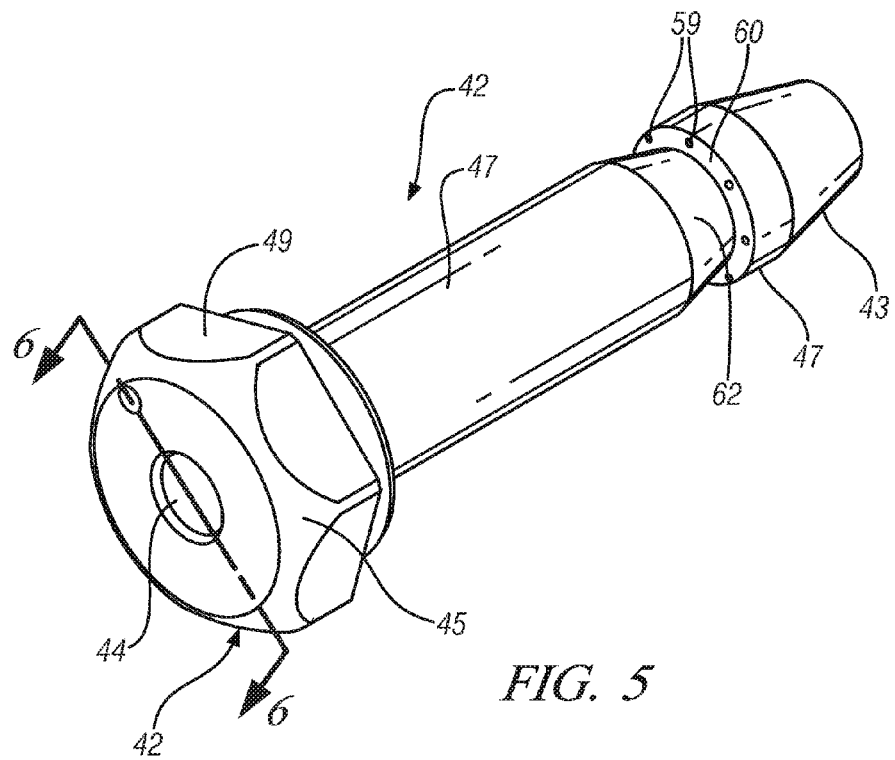
FIG. 5 is a perspective view of an injector nozzle of the HC injector of FIG. 3.
Figure 6:
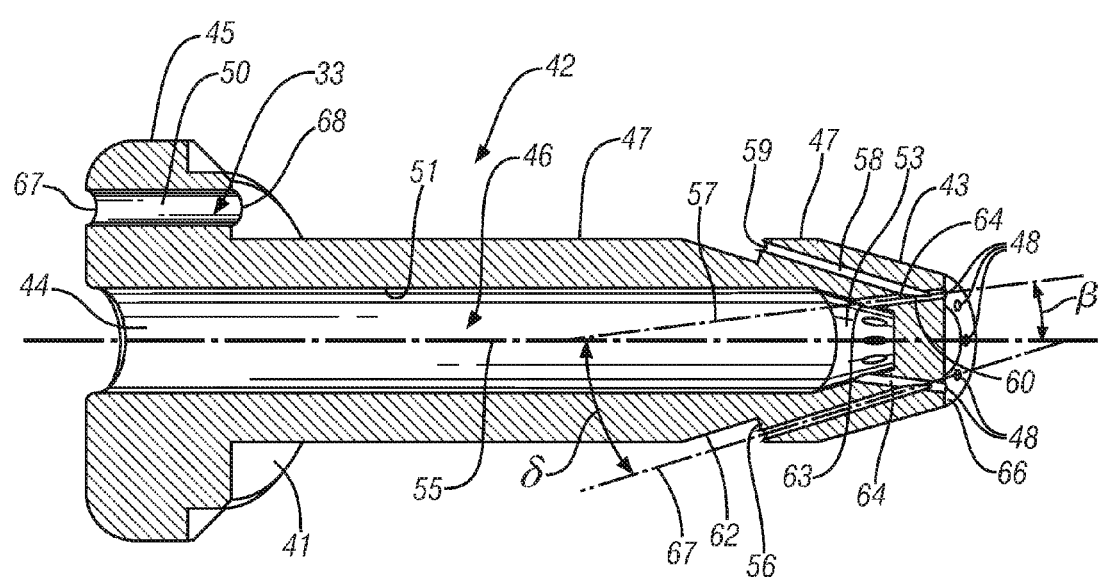
FIG. 6 is a cross-sectional perspective view of the injector nozzle of FIG. 5 taken along section 6-6.

As shown in FIGS. 3-6, 8 and 11, HC injector nozzle 42 also includes portions of air conduit 33 that extends through HC injector 12 and fluidly couples pressurized airflow 31 to fuel flow 21 to provide the air assist described herein with regard to fuel injected by HC injector 12. Air conduit 33 includes several portions within HC injector 12, including head portion 50 disposed within protruding head 45 of HC injector nozzle 42, a housing portion 54 located within injector housing 40 and a plurality of air conduit outlets 58 located within tapered nozzle tip 43 of HC injector nozzle 42. Head portion 50 of air conduit 33 includes a cylindrical bore that has an inlet 67 and an outlet 68. The inlet 67 of head portion 50 serves as the inlet of air conduit 33 (FIGS. 4-6). As shown in FIG. 2, air conduit 30 is fluidly coupled to air conduit 33 at inlet 67 using conventional fluid couplings for providing pressurized airflow 31, such as various forms of threaded or quick/snap connect sealable fittings (not shown). As illustrated in FIGS. 3, 4, 7 and 8, housing portion 54 comprises a cylindrical bore 80 that extends axially inwardly from a seating shoulder 81 of injector housing 40. Cylindrical bore 80 extends from an inlet 83 to an outlet 85. At outlet 85, cylindrical bore opens into circumferential groove 84, such as the cylindrical circumferential groove illustrated in FIGS. 4 and 8. Upon assembly of injector housing 40 and injector nozzle 42, circumferential groove 84 and chamfer 62 define a plenum 87 that is fluidly coupled to and configured to supply pressurized airflow 31 to the plurality of air conduit outlets 58. Upon assembly of HC injector nozzle 42 and injector housing 40, head portion 50, housing portion 54 and air conduit outlets 58 are aligned and fluidly coupled to form air conduit 33.

As shown in FIGS. 1, 2, 5 and 6, the plurality of air conduit outlets 58 include a plurality of fine cylindrical bores that are relatively smaller than the other portions of air conduit 33, but which have diameters that are similar in cross-section to those of the plurality of fuel outlet conduits 64. As shown in FIGS. 4-6 and 11, air conduit outlets 58 are parallel to the surface of the tapered nozzle tip 43 and extend from inlets 59 located on chamfer shoulder 56 of cylindrical section 47. Air conduit outlets 58 converge inwardly from inlets 59 to outlets 60 that open into respective fuel outlet conduits 64. The air conduit outlet axes 67 converge inwardly at a convergence angle ($\delta$) relative to the conduit axis 55. Air conduit outlets 58 open into fuel conduit outlets 64 along their length at locations that depend upon the dimensions (e.g. length and diameter) of the tapered nozzle tip 43 and the convergence angle ($\delta$). In the embodiment of FIGS. 4-6 and 11, the air conduit outlets 58 are straight cylindrical bores and the plurality of axes 67 of air conduit outlets 58 converge to a point on the conduit axis 55, and the convergence angles ($\delta$) are the same for each air conduit outlet 58; however, the convergence angles ($\delta$) may also vary from one another, depending on the requirements established for the predetermined spray pattern 61 (FIG. 2). Similarly, the size, shape and spatial orientation of each air outlet conduit 58 may be selected to open into the respective fuel conduit outlet 64 at a predetermined outlet 60 location along the length of fuel conduit outlet 64. The predetermined outlet 60 location may be the same for all fuel conduit outlets 64, or may vary for each fuel conduit outlet 64, depending on the design requirements. In the embodiment of FIGS. 4-11, the predetermined outlet 60 locations of the air conduit outlets 58 are the same for all of the outlets, namely, proximate the outlet 48 of fuel conduit outlets 64. Placement of the outlets 60 at this location injects pressurized air from airflow 31 into pressurized fuel flow 21 just as the fuel exits the HC injector nozzle 42, thereby promoting dispersion of the fuel and addition of oxygen within exhaust conduit 14 and enhancing the operation of the exhaust devices 4, including the exothermic oxidation reaction within DOC 18 and the conversion of particulate matter within DPF 20 as disclosed herein. In addition, the injection of pressurized air into fuel outlet conduits 64 proximate their outlets 48 also prevents the accumulation of soot or other particulate matter in the exhaust gas flow 11 on the injector face 66 or within fuel outlet conduits 64 while HC injector 12 is operating, or tends to clear any such particulate matter that may accumulate at these locations when the injector is not operating. The number of air conduit outlets 58 should be at least as large as the number of fuel outlet conduits 64 (i.e., a 1:1 ratio); however, more than one air conduit outlet 58 may be associated with each fuel outlet conduit 64 (i.e., a ratio greater than 1:1). Inlets 59 are located on an inclined chamfer shoulder 56 associated with chamfer 62 formed on cylindrical section 47 proximate tapered nozzle tip 43.

Figure 7:
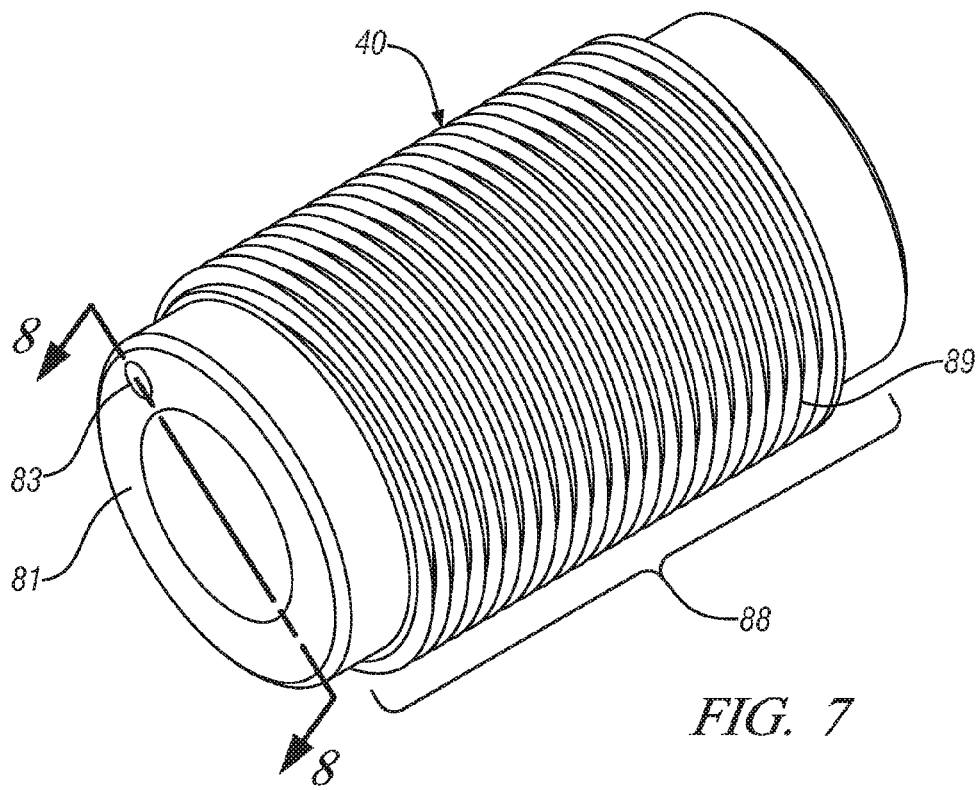
FIG. 7 is a perspective view of an injector housing of the HC injector of FIG. 3.
Figure 8:
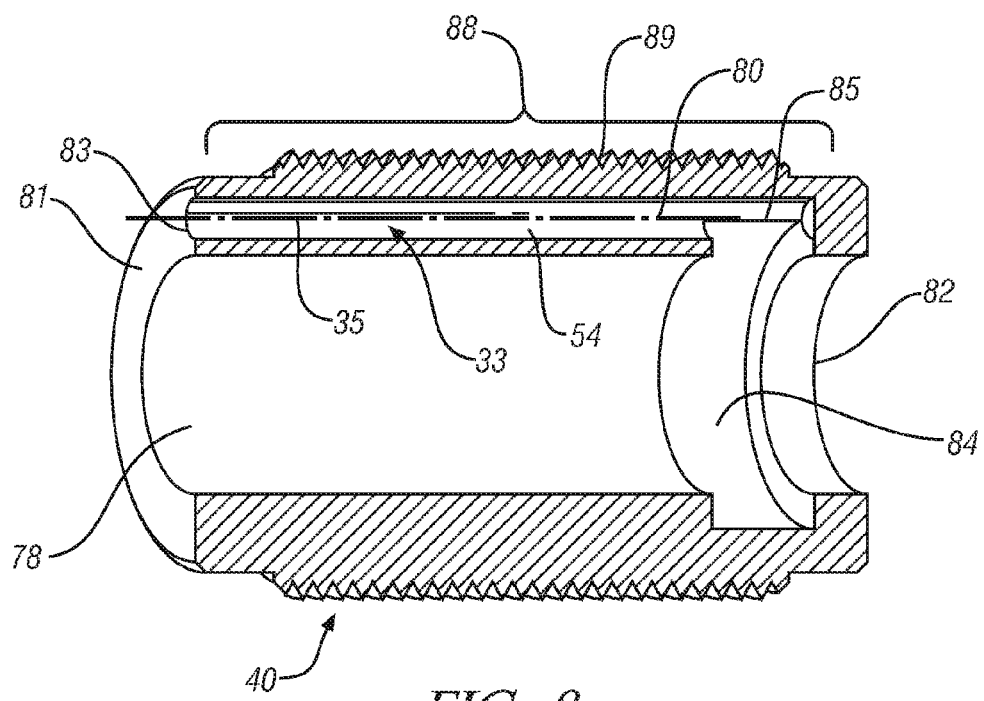
FIG. 8 is a cross-sectional perspective view of the injector housing of FIG. 7 taken along section 8-8.
Figure 11:
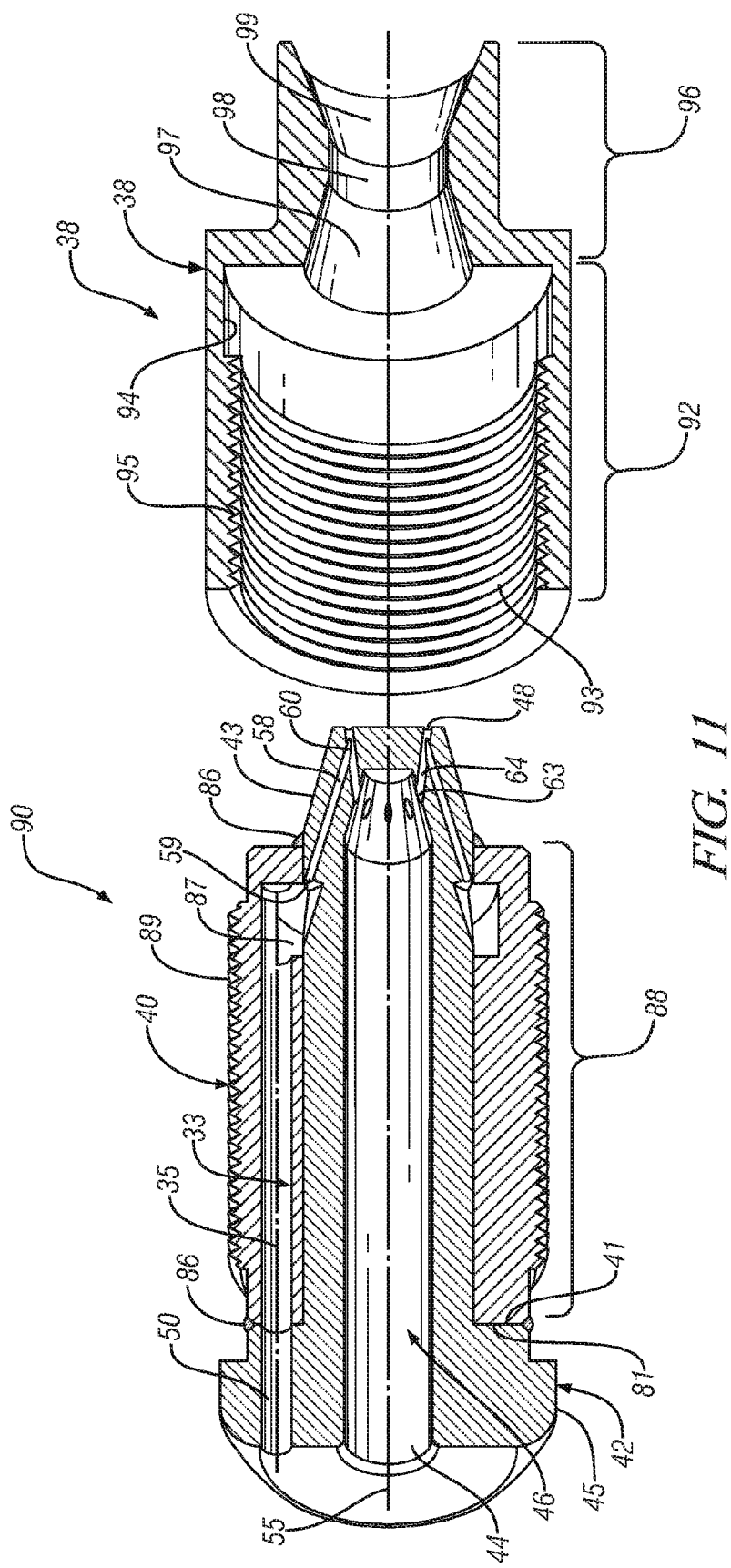
FIG. 11 is a disassembled cross-sectional perspective view of an injector nozzle/injector housing assembly and injector housing boss of the HC injector of FIG. 3.

As shown in FIGS. 4, 7 and 8, injector housing 40 is configured to receive HC injector nozzle 42. Injector housing 40 is a generally cylindrical tube. Injector housing 40 may be made from any suitable high temperature material, including the same materials described above for HC injector nozzle 42. Injector housing 40 includes a central nozzle bore 78 that is configured to receive HC injector nozzle 42, particularly cylindrical section 47. Injector housing 40 also includes housing portion 54 of air conduit 33 in the form of a cylindrical bore 80 having inlet 83 and outlet 85 as described herein. Injector housing 40 also includes circumferential groove 84. As shown in FIGS. 3, 4 and 11, injector housing 40 and injector nozzle 42 are assembled by inserting cylindrical section 47 within nozzle bore 78 until seating shoulder 41 of protruding head 45 seats against seating shoulder 81 of injector housing 40 with head portion 50 and housing portion 54 of air conduit 33 axially aligned along air conduit axis 35 as shown. Once assembled in the manner described, HC injector nozzle 42 and injector housing 40 may be fixedly attached to one another by circumferential welds 86. Welds 86 also form an air tight seal, thereby insuring the integrity of air conduit 33. The outer surface of injector housing 40 also includes a surface 88 that may be used to attach injector housing 40 to injector housing boss 38, such as threaded portion 89. Once injector housing 40 and injector nozzle 42 are assembled in the manner described, they form a nozzle/housing assembly 90. A guide pin may be inserted into head portion 50 and housing portion 54 to provide the alignment described above during the formation of welds 86 to ensure the integrity of air conduit 33, and may be removed upon the formation of nozzle/housing assembly 90.

Figure 9:
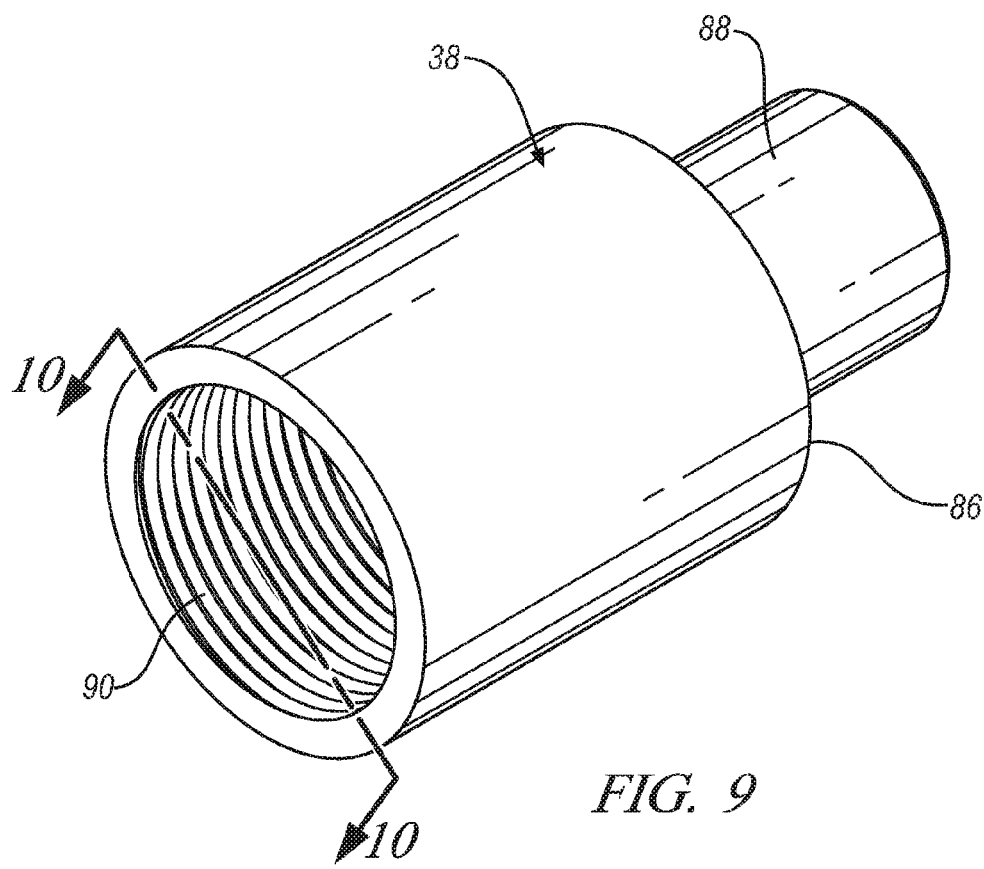
FIG. 9 is a perspective view of an injector housing boss of HC injector of FIG. 3.
Figure 10:
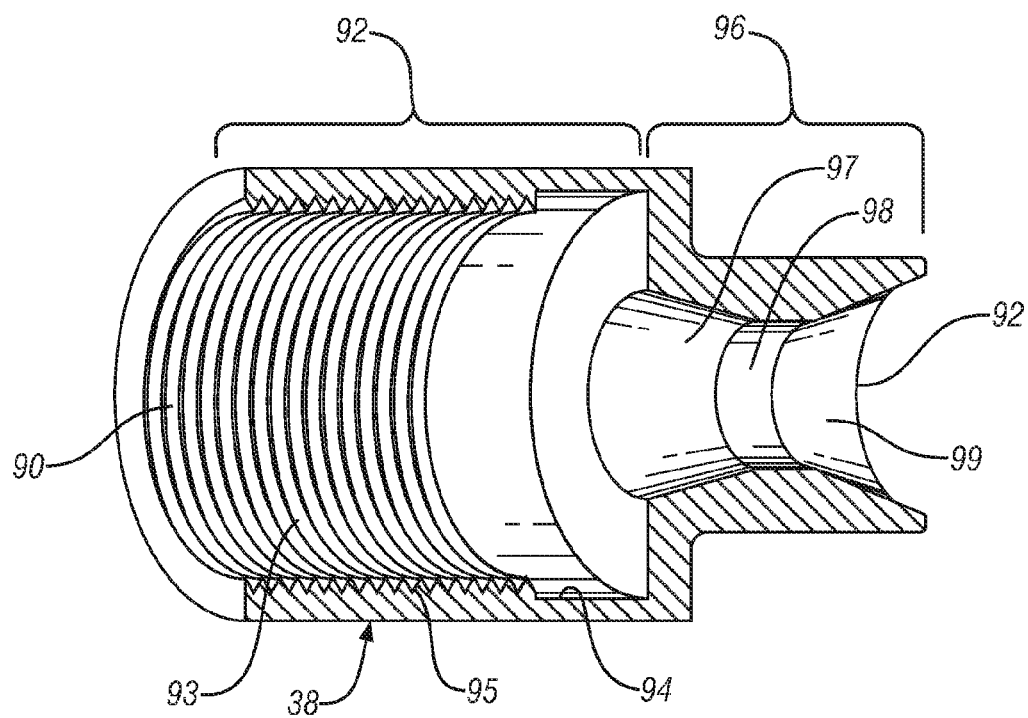
FIG. 10 is a cross-sectional perspective view of the injector housing boss of FIG. 9 taken along section 10-10.

As shown in FIGS. 9-11, injector housing boss 38 is a generally tubular structure that is configured to receive nozzle/housing assembly 90. Injector housing boss 38 is configured for attachment to exhaust conduit 14 to provide a gas-tight seal between HC injector 12 and exhaust conduit 14. The gas tight seal may be made by any suitable means for forming such a gas-tight seal, including a circumferential weld 91 between the outer surface of injector housing boss 38 and exhaust conduit 14, as shown in FIG. 2. Injector housing boss 38 has a housing portion 92 having a central bore 93 that is configured on an inner surface 94 thereof for attachment to outer surface 88 of injector housing 40. This attachment is preferably a detachable attachment such as provided by threaded portion 95, such that nozzle/housing assembly 90 having threaded portion 89 may be threaded into central bore 93 and threaded portion 95, as shown in FIGS. 3, 4 and 11. Injector housing boss 38 also includes nozzle portion 96. Nozzle portion 96 includes inwardly tapering bore 97 that opens into central bore 93 and tapers inwardly away from central bore 93. Inwardly tapering bore 97 is configured to receive tapered nozzle tip 43 and form a compression seal between the outer surface of tapered nozzle tip 43 and a surface of inwardly tapering bore 97 as nozzle/housing assembly 90 is threaded into central bore 93. Nozzle portion 96 also includes cylindrical bore 98 and outwardly tapering bore 99. Cylindrical bore 98 is configured to receive injector face 66 upon assembly of nozzle/housing assembly 90 into injector housing boss 38, as described herein. As shown in FIG. 2, nozzle portion 96 and outwardly tapering bore 99 is configured to receive spray pattern 61 during operation of HC injector 12 and provides a space for spray pattern 61 to be established prior to entry into exhaust conduit 14 and interaction with exhaust gas flow 11 flowing therein. Nozzle portion 96 and outwardly tapering bore 99 also prevent direct ingress of exhaust gas flow 11 into outlets 48, thereby reducing the propensity for accumulation of soot on outlets 48 when HC injector 12 is not operating.

Air assisted HCI system 10 and HC injector 12 have the following benefits and advantages. By using HCI system 10, HC slip through DOC 18 and DPF 20 is reduced by enhancing fuel atomization and evaporation using pressurized airflow 31. Reduced HC slip also reduces occurrences of failure of DPF 20 caused by high temperatures and large temperature gradients along the length of this device associated with HC slip. Reduced HC slip also reduces HC emissions from the tail pipe. Use of HCI system 10 and HC injector 12 also increases the DOC 18 out temperature because of the improved exothermic reaction in DOC 18 due to the improved fuel dispersion and increased oxygen available from the pressurized airflow 31, which in turn enhances the soot regeneration conversion efficiency of DPF 20. The use of HCI system 10 and the design of HC injector 12 also tend to prevent the injector nozzles from clogging caused by soot accumulation on the nozzle tip, because the pressurized air blows away soot that would otherwise accumulate on injector face 66. The use of HCI system 10 also enhances fuel economy by achieving the necessary DPF regeneration temperature using reduced amounts of fuel by enhancing the efficiency of the exothermic reaction in DOC 18 due again to the improved fuel dispersion and increased availability of oxygen from pressurized air flow 31. The incorporation of fuel flow 21 and airflow 31 in HCI system 10 also improves the durability of exhaust treatment system 2, since these flows also cool the HCI injector 12 that is exposed to exhaust gas flow 11.

While the air assisted injector, injection system and exhaust treatment system have been described in the exemplary embodiments primarily in conjunction with injection of HC, such as diesel fuel or gasoline, the invention may also be used with other injectable liquid fluids, including, for example, various liquid reactants that may be useful to promote predetermined oxidation or reduction reactions within the exhaust treatment system, such as, urea or various urea solutions. As such, the descriptions herein of various embodiments of the invention directed to the injection of HC, fuel or the like should be understood to also be applicable to the injection of other liquid fluids as if the term "fluid" or "liquid fluid" were substituted for "HC" and "fuel" therein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:
1. An air-assisted fluid injector, comprising:
   a one-piece injector nozzle comprising:
      a protruding head on one end and on another end;
      an opposed nozzle tip having an exposed injector face; and
      a cylindrical section disposed between the protruding head and the nozzle tip, the injector nozzle having a fluid conduit that extends from a fluid inlet in the protruding head toward the injector face and that opens into a plurality of fluid outlet conduits in the nozzle tip that extend to a corresponding plurality of spaced apart fluid outlets on the injector face;
   an injector housing having a nozzle bore and an outer surface, the injector nozzle sealably disposed in, and the cylindrical section entirely enclosed within, the nozzle bore, the exposed injector face on the nozzle tip projecting from the nozzle bore;
   an air conduit comprising;
      a head portion having an air inlet disposed in the protruding head, and a housing portion disposed within and —extending through the injector housing, the housing portion opening into a plurality of air outlet conduits disposed in the nozzle tip, each air outlet conduit extending to and opening into a respective fluid outlet conduit, wherein the air conduit is configured to receive a pressurized airflow at the air inlet and pass it through the head portion into the housing portion and then into the air outlet conduits; and an injector housing boss having a boss housing portion on one end and a nozzle portion on another end, the outer surface of the injector housing disposed within the boss housing portion, the injector nozzle disposed within the nozzle portion, the nozzle portion comprising an outwardly tapering bore that encloses and extends outwardly away from the injector face.

2. The injector of claim 1, wherein the plurality of fluid outlet conduits diverge from an axis of the injector nozzle toward the injector face.

3. The injector of claim 2, wherein the plurality of fluid outlet conduits diverge from the axis of the fluid conduit at an angle ($\alpha$).

4. The injector of claim 3, wherein $\alpha$ is about 8° to about 11°.

5. The injector of claim 2, wherein the plurality of fluid outlet conduits are arranged in conically diverging pattern.

6. The injector of claim 2, wherein the plurality of air outlet conduits converge toward the injector face.

7. The injector of claim 1, wherein the plurality of fluid outlets are radially spaced apart about an axis of the injector nozzle on the injector face.

8. The injector of claim 1, wherein the air conduit opens into a circumferential plenum formed between the nozzle bore and an outer surface of the injector nozzle, and the plurality of air conduit outlets open from the plenum into the injector nozzle.

9. The injector of claim 1, wherein the injector housing is detachably disposed within the boss housing portion and the injector nozzle is sealably disposed within the nozzle portion.

10. The injector of claim 1, wherein the protruding head comprises a hexagonal bolt head.

11. An air-assisted fluid injector system, comprising:
an injector comprising:
a one-piece injector nozzle comprising:
a protruding head on one end and on another end;
an opposed nozzle tip having an exposed injector face; and
a cylindrical section disposed between the protruding head and the nozzle tip, the injector nozzle having a fluid conduit that extends from a fluid inlet in the protruding head toward the injector face and that opens into a plurality of fluid outlet conduits in the nozzle tip that extend to a corresponding plurality of spaced apart fluid outlets on the injector face;
an injector housing having a nozzle bore and an outer surface, the injector nozzle sealably disposed in, and the cylindrical section entirely enclosed within, the nozzle bore, the exposed injector face on the nozzle tip projecting from the nozzle bore;
an air conduit comprising:
a head portion having an air inlet disposed in the protruding head, and
a housing portion disposed within and extending through the injector housing, the housing portion opening into a plurality of air outlet conduits disposed in the nozzle tip, each air outlet conduit extending to and opening into a respective fluid outlet conduit, wherein the air conduit is configured to receive a pressurized airflow at the air inlet and pass it through the head portion into the housing portion and then into the air outlet conduits; and an injector housing boss having a boss housing portion on one end and a nozzle portion on another end, the outer surface of the injector housing disposed within the boss housing portion, the injector nozzle disposed within the nozzle portion, the nozzle portion comprising an outwardly tapering bore that encloses and extends outwardly away from the injector face;

a source of a pressurized fluid that is fluidly coupled by a fluid source conduit to the inlet of the fluid conduit for release of pressurized fluid into the injector;

a source of pressurized air that is fluidly coupled by an air source conduit to the inlet of the air conduit for release of the pressurized airflow into the injector; and a controller that is in signal communication with the source of pressurized fluid and the source of pressurized air and is configured to control the release of a pressurized fluid flow and the pressurized airflow from the injector in the predetermined spray pattern.

12. The injector system of claim 11, wherein the injector housing is detachably disposed within the boss housing portion and the injector nozzle is sealably disposed within the nozzle portion.

13. The injector system of claim 11, wherein the protruding head comprises a hexagonal bolt head.

14. The injector system of claim 11, wherein the source comprises a pressurized fluid comprising a hydrocarbon or a urea solution.

15. The injector system of claim 14, wherein the pressurized fluid is a hydrocarbon comprising diesel fuel or gasoline.

16. An internal combustion engine and exhaust gas treatment system having an air-assisted fluid injector system, comprising:
an internal combustion engine;
an exhaust gas treatment system comprising at least one exhaust treatment device that is fluidly coupled by an exhaust conduit to the engine and configured to receive an exhaust gas flow therefrom;
an injector system comprising: an injector, the injector comprising:
a one-piece injector nozzle comprising:
a protruding head on one end and on another end;
an opposed nozzle tip having an exposed injector face; and
a cylindrical section disposed between the protruding head and the nozzle tip, the injector nozzle having a fluid conduit that extends from a fluid inlet in the protruding head toward the injector face and that opens into a plurality of fluid outlet conduits in the nozzle tip that extend to a corresponding plurality of spaced apart fluid outlets on the injector face;
an injector housing having a nozzle bore and an outer surface, the injector nozzle sealably disposed in, and the cylindrical section entirely enclosed within, the nozzle bore, the exposed injector face on the nozzle tip projecting from the nozzle bore;
an air conduit comprising:
a head portion having an air inlet disposed in the protruding head, and
a housing portion disposed within and extending through the injector housing, the housing portion opening into a plurality of air outlet conduits disposed in the nozzle tip, each air outlet conduit extending to and opening into a respective fluid outlet conduit, wherein the air conduit is configured to receive a pressurized airflow at the air inlet and pass it through the head portion into the housing portion and then into the air outlet conduits; and an injector housing boss having a boss housing portion on one end and a nozzle portion on another end, the outer surface of the injector housing disposed within the boss housing portion, the injector nozzle disposed within the nozzle portion, the nozzle portion comprising an outwardly tapering bore that encloses and extends outwardly away from the injector face wherein the injector housing boss is attached to the exhaust conduit upstream of the exhaust treatment device and the plurality of fluid outlets are in fluid communication with the exhaust gas flow;

a source of a pressurized fluid that is fluidly coupled by a fluid source conduit to the inlet of the fluid conduit for release of pressurized fluid into the injector;

a source of pressurized air that is fluidly coupled by an air source conduit to the inlet of the air conduit for release of the pressurized airflow into the injector; and a controller that is in signal communication with the source of pressurized fluid and the source of pressurized air and is configured to control the release of a pressurized fluid flow and the pressurized airflow from the injector in a predetermined spray pattern.

17. The internal combustion engine and exhaust gas treatment system of claim 16, wherein the pressurized fluid flow and the pressurized airflow from the injector are released in a downstream direction.

18. The internal combustion engine and exhaust gas treatment system of claim 16, wherein the pressurized fluid flow comprises a diesel fuel or gasoline and the source of the pressurized fluid flow comprises a fuel pump that is fluidly coupled to a fuel tank.

19. The internal combustion engine and exhaust gas treatment system of claim 18, wherein the source of the pressurized fluid flow further comprises a fuel pressure regulator and valve for releasing the diesel fuel or gasoline to the injector.

20. The internal combustion engine and exhaust gas treatment system of claim 16, wherein the source of the pressurized air comprises an air compressor that is fluidly coupled to an air pressure regulator and a valve for releasing the pressurized airflow to the injector.

21. The internal combustion engine and exhaust gas treatment system of claim 16, wherein the injector housing is detachably disposed within the boss housing portion and the injector nozzle is sealably disposed within the nozzle portion.

* * * * *